(12) United States Patent
Bonarens et al.

(10) Patent No.: US 10,272,910 B2
(45) Date of Patent: Apr. 30, 2019

(54) DRIVER ASSISTANCE SYSTEM AND METHODS FOR COLLISION AVOIDANCE

(71) Applicant: Adam Opel AG, Rüsselsheim (DE)

(72) Inventors: Frank Bonarens, Ruesselsheim (DE); Jens Ferdinand, Ruesselsheim (DE)

(73) Assignee: OPEL AUTOMOBILE GMBH, Russelheim (DE)

( * ) Notice: Subject to any disclaimer, the term of this patent is extended or adjusted under 35 U.S.C. 154(b) by 142 days.

(21) Appl. No.: 15/383,789

(22) Filed: Dec. 19, 2016

(65) Prior Publication Data

US 2017/0183004 A1 Jun. 29, 2017

(30) Foreign Application Priority Data

Dec. 18, 2015 (DE) .......................... 10 2015 016 531

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 10/20* (2013.01); *B60W 30/0953* (2013.01); *B60W 30/0956* (2013.01); *G05D 1/0246* (2013.01); *G08G 1/165* (2013.01); *B60W 2420/42* (2013.01); *B60W 2510/18* (2013.01); *B60W 2510/20* (2013.01); *B60W 2520/06* (2013.01); *B60W 2520/125* (2013.01);
(Continued)

(58) Field of Classification Search
CPC ...... B60W 30/09; B60W 10/18; B60W 10/20; B60W 30/0953; B60W 30/0956; G05D 1/0246; G08G 1/165
See application file for complete search history.

(56) References Cited

U.S. PATENT DOCUMENTS 7,729,841 B2 6/2010 Knoop et al.
8,918,273 B2 12/2014 Knoop et al.
(Continued)

FOREIGN PATENT DOCUMENTS

DE 3830790 A1 3/1990
DE 102005002760 A1 8/2005

OTHER PUBLICATIONS

German Patent Office, German Search Report for German Application No. 102015016531.3, dated Sep. 23, 2016.
(Continued)

*Primary Examiner* — Mary Cheung
(74) *Attorney, Agent, or Firm* — Sandberg Phoenix & von Gontard, P.C.

(57) ABSTRACT

A driver assistance system for collision avoidance includes an environmental sensor for detecting an obstacle on an anticipated trajectory of a vehicle. A computing unit searches for a first evasion trajectory on which the obstacle is collision-free and for a second evasion trajectory which is transmitted from the probable trajectory and on which the obstacle can be traversed without collision. A steering system is controllable by a computing unit to steer the vehicle along one of the evasion trajectories. The computing unit is arranged to steer the steering system only and to steer the vehicle along the first evasion trajectory when the search for the second evasion trajectory is unsuccessful.

14 Claims, 2 Drawing Sheets

(51) Int. Cl.
*B60W 10/20* (2006.01)
*B60W 30/095* (2012.01)
*G05D 1/02* (2006.01)
*G08G 1/16* (2006.01)

(52) U.S. Cl.
CPC ..... *B60W 2550/10* (2013.01); *B60W 2550/30* (2013.01); *B60W 2550/308* (2013.01); *B60W 2710/18* (2013.01); *B60W 2710/20* (2013.01); *B60W 2720/125* (2013.01); *B60W 2720/24* (2013.01); *B60W 2750/308* (2013.01)

(56) References Cited

U.S. PATENT DOCUMENTS

| | | | |
|---|---|---|---|
| 9,031,743 B2 | 5/2015 | Okita | |
| 2014/0074388 A1* | 3/2014 | Bretzigheimer | B60T 1/10 701/117 |
| 2014/0316668 A1* | 10/2014 | Akiyama | B60W 10/184 701/70 |

OTHER PUBLICATIONS

German Patent Office, German Search Report for German Application No. 102015016544.5, dated Sep. 28, 2016.

* cited by examiner

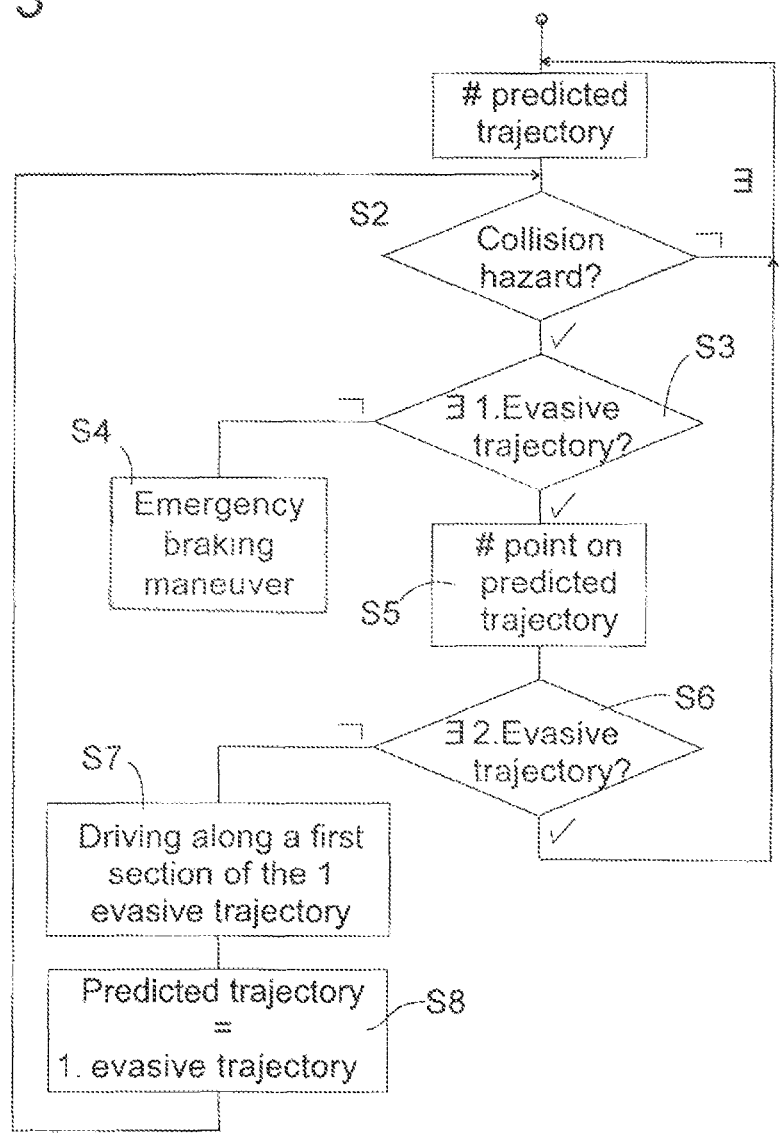

DRIVER ASSISTANCE SYSTEM AND METHODS FOR COLLISION AVOIDANCE

CROSS REFERENCE TO RELATED APPLICATION

This application claims priority to German Patent Application No. 102015016531.3 filed Dec. 18, 2015, which is incorporated herein by reference in its entirety.

TECHNICAL FIELD

The present invention pertains to a driver assistance system for avoiding collisions of motor vehicles, as well as a method that can be implemented with such a driver assistance system.

BACKGROUND

A driver assistance system for avoiding collisions is known from EP 2 141 057 A1. This conventional driver assistance system may be designed for intervening in the steering system of the vehicle in order to steer the vehicle around a detected obstacle, as well as for merely informing the driver of the vehicle of an existing collision hazard and thereby surrendering a potentially required evasive maneuver to the driver.

If the known system is used for informing the driver of a collision hazard, it is of vital importance that the warning is issued sufficiently early for giving the driver the opportunity to react appropriately. However, the earlier the warning is issued, the higher the probability that it is unjustified and that the driver becomes accustomed to ignoring warnings of the driver assistance system.

If the driver assistance system is not limited to issuing warnings, but also intervenes in the steering system, it can be expected that the driver will no longer use such an assistance system as soon as it has unjustifiably intervened in the steering system at one point.

SUMMARY

The present invention is based on developing a driver assistance system and a method for its operation, in which the driver assistance system is in fact able to intervene in the steering system in hazardous situations, but an unnecessary intervention can be prevented with virtual certainty.

According to an embodiment of the invention, a driver assistance system includes a proximity sensor for detecting an obstacle on a predicted trajectory of a vehicle, typically the vehicle, in which the driver assistance system is installed; a computer unit for searching for a first evasive trajectory, on which the vehicle can drive around the obstacle without colliding, and for searching for a second evasive trajectory, which branches off the predicted trajectory at a future point in time and on which the vehicle can drive around the obstacle without colliding; a steering system that can be activated by the computer unit in order to steer the vehicle along one of the evasive trajectories; wherein the computer unit is designed for only activating the steering system and steering the vehicle along the first evasive trajectory if the search for the second evasive trajectory is unsuccessful.

This ensures that the inventive driver assistance system does not intervene in the steering system until the obstacle is so close that a first evasive trajectory in fact still exists, but a second evasive trajectory no longer exists at a future point in time. In this way, the driver assistance system does not intervene in the steering system until the latest possible moment, i.e. at a time, at which an impending collision can be predicted with high certainty, but at which the driver would have had to deviate from the predicted trajectory long ago if the driver would have perceived and attempt to evade the obstacle. Consequently, the inventive driver assistance system only takes action when the driver is no longer able to do so. As long as the obstacle itself was correctly detected, a situation, in which the driver can subsequently evaluate the intervention of the computer unit into the steering system as unnecessary, is therefore precluded.

In this context, the term steering system should be interpreted in a general sense; the driver of a motor vehicle not only steers the vehicle along a desired trajectory by adjusting a toe angle of the steerable wheels, but may also accelerate or decelerate the vehicle, such that the steering system should accordingly also be able to activate the engine and/or the brakes of the vehicle in addition to the steerable wheels in order to steer the vehicle along the evasive trajectory. It is frequently required, in particular, to decelerate the vehicle along an evasive trajectory in order to ensure that the vehicle can be maintained in its traffic lane after following the evasive trajectory.

The predicted trajectory can be determined in different ways. Since the respective predicted trajectory only has to extend into the future for a short period of time, which typically amounts to a few seconds or only fractions of a second depending on the vehicle speed, the prognosis of the predicted trajectory can be realized with high accuracy.

In the simplest case, the determination of the predicted trajectory may be based on a mere extrapolation of the previous vehicle motion. It is also conceivable to take into account the course of a roadway lying in front of the vehicle and to provide a proximity sensor for its detection. This may concern the same proximity sensor, which is also used for detecting an obstacle.

An infinite variety of candidate evasive trajectories typically exists at all times and the computer unit can respectively select the most suitable of these candidate evasive trajectories as the first or second evasive trajectory. In order to ensure that the vehicle is actually able to drive along such a candidate evasive trajectory without violating the laws of kinematics, the computer unit should advantageously be designed such that it only considers a candidate evasive trajectory as first or second evasive trajectory if a maximum value of the acceleration is not exceeded along the entire candidate evasive trajectory. This maximum value should be sufficiently low for precluding the vehicle wheels from skidding on the roadway.

According to another advantageous boundary condition, which should be fulfilled by a candidate evasive trajectory, the lateral offset between the predicted trajectory and the candidate evasive trajectory cannot exceed a predefined maximum value in order to ensure that the vehicle can drive along the candidate evasive trajectory within the available roadway width.

In addition, the speed of the vehicle transverse to the driving direction should at the end of the candidate evasive trajectory be sufficiently low for ensuring that the vehicle is not carried off the roadway after following the candidate evasive trajectory. With respect to a straight roadway, this means that the speed and the acceleration in the lateral direction of the vehicle should be zero at the end of the candidate evasive trajectory.

The future point in time, at which the second evasive trajectory branches off the predicted trajectory, should lie in the future by at least as long as the computer unit requires for determining a second evasive trajectory such that all steps of the method can be carried out between the current and the future point in time and a new iteration of the method can begin at said future point in time.

In the simplest case, the computer unit may be designed for extrapolating the predicted trajectory from an already driven trajectory of the vehicle, for example, by adapting polynomials to longitudinal and lateral coordinates of the already driven trajectory and calculating their values at the future point in time. Although the reliability of such an extrapolation rapidly decreases proportionally to the length of the extrapolation time, adequate accuracy can be achieved for the relevant extrapolation times of a few seconds or fractions of a second.

According to an enhancement, a roadway course that is detected by a proximity sensor in the above-described fashion or a roadway course that is predicted by a conventional navigation system based on map material stored therein may also be taken into consideration in the determination of the predicted trajectory.

The computer unit may be designed for internally mapping the evasive trajectories in the form of polynomials, the argument of which is the time and the functional value of which is a position coordinate, particularly in the longitudinal or lateral direction of the vehicle.

The state of motion of the vehicle at the current point in time can be easily taken into consideration in the selection of these polynomials by setting the respective position, speed and acceleration of the vehicle at the beginning of the evasive trajectory as lowest order coefficients of these polynomials.

The computer unit should ideally be able to respectively repeat the method within such short time intervals that a second evasive trajectory determined in a given iteration of the method can be used as first trajectory in the next iteration and does not have to be calculated anew. The aforementioned second evasive trajectory can only be rendered unusable in exceptional cases, in which the motion of the vehicle significantly deviated from the predicted trajectory or other unforeseen events occurred. If the search for the first evasive trajectory is unsuccessful in this case, the computer unit can decelerate the vehicle in the form of an emergency braking maneuver.

According to another embodiment of the invention, a method for avoiding collisions includes the steps of a) estimating a predicted trajectory of a vehicle; b) detecting an obstacle on the predicted trajectory; c) searching for a first evasive trajectory, on which the vehicle can drive around the obstacle without colliding; d) searching for a second evasive trajectory, which branches off the predicted trajectory at a future point in time and on which the vehicle can drive around the obstacle without colliding; and e) steering the vehicle along the first evasive trajectory if the search for the second evasive trajectory is unsuccessful.

In practical applications, steps a) through d) are repeated in a cyclic fashion in order to quickly update the predicted trajectory and potential second evasive trajectories based thereon. If the vehicle is still positioned on the predicted trajectory at the future point in time, for which the second evasive trajectory was calculated, and a second iteration of the method is carried out at this point in time, the second evasive trajectory obtained in the first iteration can be used as first evasive trajectory in the second iteration such that no additional processing power is required for its calculation.

The invention also pertains to a computer program product with program code means that enable a computer to operate as a computer unit in a driver assistance system in the above-described fashion or to carry out the above-described method, as well as to a machine-readable data carrier, on which program instructions are recorded that enable a computer to operate in this fashion.

The invention furthermore pertains to a device for avoiding collisions with a) means for estimating a predicted trajectory of a vehicle; b) means for detecting an obstacle on the predicted trajectory; c) means for searching for a first evasive trajectory, on which the vehicle can drive around the obstacle without colliding; d) means for searching for a second evasive trajectory, which branches off the predicted trajectory at a future point in time and on which the vehicle can drive around the obstacle without colliding; and e) means for steering the vehicle along the first evasive trajectory if the search for the second evasive trajectory is unsuccessful.

BRIEF DESCRIPTION OF DRAWINGS

Other characteristics and advantages of the invention can be gathered from the following description of exemplary embodiments with reference to the attached figures. In these figures:

FIG. 3 shows a flow chart of an operating method of the driver assistance system.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
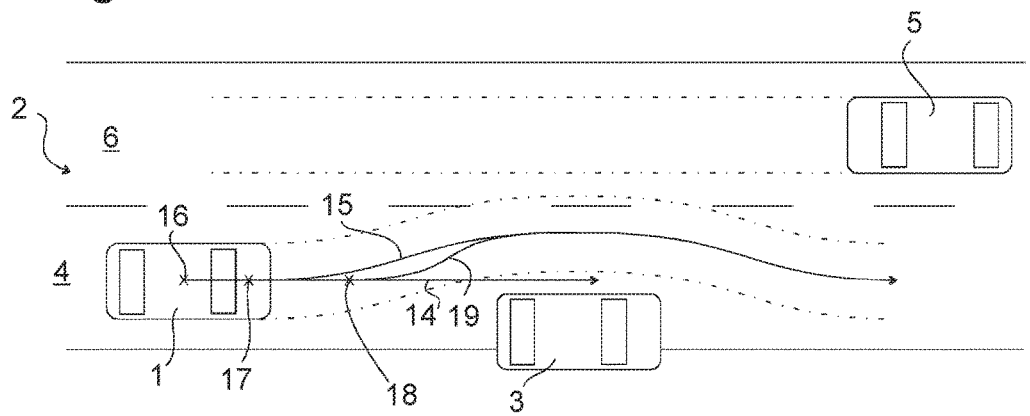
FIG. 1 shows a typical traffic situation, in which the driver assistance system can be used.

FIG. 1 shows a motor vehicle 1 that is equipped with the inventive driver assistance system and travels along a two-lane road 2. A vehicle parked on the roadside blocks part of the traffic lane 4, along which the motor vehicle 1 travels, and therefore represents an obstacle 3 that has to be avoided by the motor vehicle 1 in order to prevent a collision.

Another vehicle 5 travels in an oncoming traffic lane of the road 2. However, an evasive maneuver of the motor vehicle 1 in the direction of the oncoming traffic lane 6 in order to avoid the obstacle 3 cannot provoke a collision with the vehicle 5.

Figure 2:
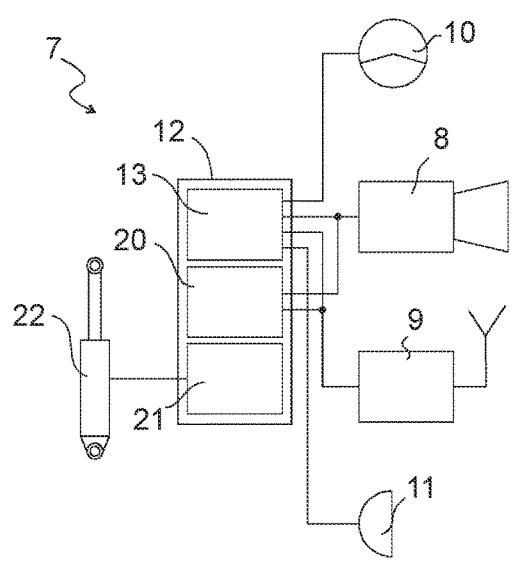
FIG. 2 shows a block diagram of the driver assistance system.

FIG. 2 shows a block diagram of the driver assistance system 7, with which the motor vehicle 1 is equipped. The driver assistance system 7 comprises a proximity sensor 8, in this case a camera that is directed at the road 2 lying in front of the motor vehicle 1, in order to detect the course of the road 2, as well as potential obstacles 3 thereon such as the parked vehicle. Alternatively, a radar sensor may also be provided for the obstacle detection.

A conventional navigation system 9, which provides data on the course of the currently traveled road 2, may be provided in order to enhance the detection of the course of the road with the aid of the camera 8.

A steering wheel sensor 10 may serve for detecting the angle adjusted on the steering wheel of the motor vehicle 1 by the driver and for estimating a trajectory of the motor vehicle 1 resulting thereof; in addition, an acceleration sensor 11 may be provided for detecting longitudinal and lateral accelerations, to which the motor vehicle 1 is subjected along its trajectory.

A computer unit 12, typically a microcomputer, is connected to the sensors 8, 10, 11 and the navigation system 9. A first utility program 13 running on this microcomputer serves for determining a predicted trajectory, on which the motor vehicle 1 will continue to move from its current position illustrated in FIG. 1. In this context, the term trajectory refers to a curve in a multidimensional space, the coordinates of which include at least the two position coordinates x and y, as well as a time coordinate. The determination of the predicted trajectory is based on the data on the previous trajectory of the motor vehicle 1 delivered by the steering wheel sensor 10 and the acceleration sensor 11, if applicable with consideration of the further course of the road 2, which can be derived from the data of the navigation system 9 and/or the camera 8. If the motor vehicle 1 has in the recent past moved straightforward on the road 2 and the further course of the road 2, as far as known, indicates that the road 2 continues in a straight line, the utility program 13 determines the straight trajectory identified by the reference symbol 14 in FIG. 1 as the predicted trajectory in step S1 of the flow chart in FIG. 3.

The predicted trajectory 14 can generally be expressed in the form of two respective polynomials for coordinates x in the longitudinal direction of the vehicle and coordinates y in the lateral direction of the vehicle:

$$x(t) = b_0 + b_1 t + b_2 t^2 + b_3 t^3 + b_4 t^4 + b_5 t^5$$

$$y(t) = c_0 c_1 t + c_2 t^2 + c_3 t^3 + c_4 t^4 + c_5 t^5$$

wherein the initial position ($b_0$, $c_0$) can be set equal to zero without loss of generality, ($b_1$, $c_1$) and ($b_2$, $c_2$) respectively represent the speed and the acceleration of the motor vehicle 1 at the current time t=0 and the remaining coefficients can be determined by adapting the polynomials to positions or speeds of the motor vehicle, which were determined at a previous point in time with the aid of the sensors 8, 10, 11.

Based on this predicted trajectory 14 and the data of the proximity sensor 8, the utility program 13 checks if an obstacle 3 exists, with which the motor vehicle 1 could collide while driving along the predicted trajectory 14 (step S2). If a collision hazard is negated, the method returns to the starting point and once again begins with the determination of the predicted trajectory S1 after a predefined waiting period Δt.

In the traffic situation illustrated in FIG. 1, step S2 comprises the detection of a collision hazard in the form of the parked vehicle while the vehicle is located at the point 16. In this case, the method branches out to step S3 in order to calculate a first evasive trajectory 15. Another utility program 20 may be provided in the computer unit 12 for this calculation. The point 17, at which the first evasive trajectory 15 branches off the predicted trajectory 14, should lie sufficiently far in the future such that the steps of the method described below can be processed before the motor vehicle 1 has reached this point 17.

The motor vehicle 1 can be driven around the parked vehicle 3 on any number of trajectories, but not all of these trajectories are necessarily suitable as an evasive trajectory. Only trajectories that continuously follow the previously driven trajectory, i.e. trajectories to which ($b_0$,$c_0$)=0 likewise applies and in which ($b_1$,$c_1$) and ($b_2$,$c_2$) respectively correspond to the speed and the acceleration of the motor vehicle 1 at the current time t=0, may be considered as evasive trajectories.

Trajectories are discarded as unsuitable in any case if the amount of the acceleration vector $\vec{a}$, which is composed of an acceleration component in the longitudinal direction of the vehicle and an acceleration component in the lateral direction of the vehicle, is greater than the maximum acceleration, at which the wheels of the vehicle 1 are not yet skidding, i.e. trajectories to which the following applies in at least one point:

$$|\vec{a}(t)|^2 = \frac{d^2 b(t)}{dt} + \frac{d^2 c(t)}{dt} > a_{max}^2$$

Trajectories are furthermore discarded if the motor vehicle 1 has not returned to its traffic lane 4 at the end of the trajectory and/or if the speed of the motor vehicle 1 in the lateral direction of the vehicle dy/dt is not adapted to the further course of the road 2, i.e. trajectories on which the motor vehicle 1 approaches an edge of the traffic lane 4 with non-disappearing speed at the end of the trajectory.

If it is determined in step S3 that no trajectories fulfilling these requirements exist, the collision can no longer be prevented and the computer unit 12 can at this point merely initiate an emergency braking maneuver (S4) in order to limit the consequences of the collision. However, if a first evasive trajectory 15 that fulfills the requirements is found in step S3, another point on the predicted trajectory 14 determined in step S1, which is spaced apart from the current location 16 of the motor vehicle 1 by a greater distance than the point 17 at which the first evasive trajectory 15 branches off the predicted trajectory 14, is defined in step S4. This point 18 is preferably chosen such that the time between the start of the method at the point 16 and reaching the point 18 is Δt.

A search for an evasive trajectory in 19 is once again carried out (S6) starting at this point 18. A candidate evasive trajectory can only be considered as a suitable second evasive trajectory if it fulfills the same boundary conditions as the first evasive trajectory in step S3. If such a second evasive trajectory 19 exists, the collision hazard is not yet immediate and the computer unit 12 can let the time period Δt elapse and subsequently start the method anew with step S1.

However, if it is determined in step S6 that no such second evasive trajectory 19 exists, the first evasive trajectory 15 determined in step S3 is obviously the last option for avoiding the obstacle 3. In this case, another utility program 21 of the computer unit 12 is invoked in order to intervene in the steering system of the motor vehicle, which is schematically symbolized by an actuating cylinder 22 in FIG. 1, and to begin steering the motor vehicle 1 along the first evasive trajectory 15 (S7).

In order to still take into account the developments in the surroundings of the motor vehicle 1 such as, for example, the oncoming vehicle 5 while steering along the first evasive trajectory 15, the previous predicted trajectory 14 is immediately replaced with the first evasive trajectory 15 in step S8 and the method jumps back to step S2 in order to check if the first evasive trajectory 15 is still clear of any collision hazards. As long as the vehicle 5 continues on its straight trajectory along the oncoming traffic lane 6, there is sufficient space for the vehicle 1 to pass between the vehicles 3 and 5 such that the collision hazard is negated in step S2 and the motor vehicle 1 can continue to follow the evasive trajectory 15. However, a search for an evasive trajectory has to be carried out once again in step S3 if the vehicle 5 drifts toward the center of the road 2 such that the motor vehicle can no longer pass between the vehicles 3, 5.

Although the preceding detailed description and the drawings concern certain exemplary embodiments of the invention, it goes without saying that they are only intended for elucidating the invention and should not be interpreted as restrictions to the scope of the invention. The described embodiments can be modified in various ways without deviating from the scope of the following claims and their equivalents. The description and the figures particularly also disclose characteristics of the exemplary embodiments that are not mentioned in the claims. Such characteristics may also occur in combinations other than those specifically disclosed herein. The fact that several such characteristics are mentioned together in the same sentence or in a different context therefore does not justify the conclusion that they can only occur in the specifically disclosed combination; instead, it should basically be assumed that individual characteristics of several such characteristics can also be omitted or modified as long as the functionality of the invention is not compromised.

The invention claimed is:

1. A driver assistance system for collision avoidance comprising:
   a proximity sensor configured to detect an obstacle on a predicted trajectory of a vehicle;
   a computer unit configured to search for a first evasive trajectory, on which the vehicle can drive around the obstacle without colliding with the obstacle, and to search for a second evasive trajectory on which the vehicle can drive around the obstacle without colliding with the obstacle, the second evasive trajectory branching off the predicted trajectory at a future point in time relative to the first evasive trajectory;
   a steering system activated by the computer unit in order to steer the vehicle along at least one of the first or second evasive trajectories;
   wherein the computer unit is configured to only activating the steering system and steer the vehicle along the first evasive trajectory if the search for the second evasive trajectory is unsuccessful.

2. The driver assistance system according to claim 1, further comprising a proximity sensor configured to detect a roadway in front of the vehicle.

3. The driver assistance system according to claim 1, wherein the steering system is configured to decelerate and accelerate the vehicle while driving along the first evasive trajectory.

4. The driver assistance system according to claim 3, wherein the computer unit is configured to determine a maximum value of the acceleration along a candidate evasive trajectory, and to only consider the candidate evasive trajectory as first or second evasive trajectory when the maximum value does not exceed a predefined maximum value along the candidate evasive trajectory in its entirety.

5. The driver assistance system according to claim 3, wherein the computer unit is configured to decelerate the vehicle if the search for the first evasive trajectory is unsuccessful.

6. The driver assistance system according to claim 1, wherein the computer unit is configured to determine a lateral offset between the predicted trajectory and the candidate evasive trajectory and to only consider the candidate evasive trajectory as the first or second evasive trajectory when the lateral offset does not exceed a predefined maximum value.

7. The driver assistance system according to claim 1, wherein the future point in time lies in the future by at least as long as the computer unit requires for determining a second evasive trajectory.

8. The driver assistance system according to claim 1, wherein the time (at) by which the future point in time lies in the future is permanently predefined.

9. The driver assistance system according to claim 1, wherein the computer unit is configured to extrapolate the predicted trajectory from an already driven trajectory.

10. The driver assistance system according to claim 9, wherein the computer unit is configured to search for the first and second evasive trajectories among polynomials, the lowest order coefficients of which respectively indicate the position, speed and acceleration of the vehicle at the beginning of the evasive trajectory.

11. The driver assistance system according to claim 1, wherein the computer unit is configured to map the first and second evasive trajectories in the form of polynomials, the argument of which is the time and the functional value of which is a position coordinate.

12. A method for avoiding collisions comprising:
   a) estimating a predicted trajectory of a vehicle;
   b) detecting an obstacle on the predicted trajectory;
   c) searching for a first evasive trajectory on which the vehicle can drive around the obstacle without colliding with the obstacle;
   d) searching for a second evasive trajectory on which the vehicle can drive around the obstacle without colliding with the obstacle, the second evasive trajectory branching off the predicted trajectory at a future point in time relative to the first evasive trajectory; and
   e) steering the vehicle along the first evasive trajectory when the search for the second evasive trajectory is unsuccessful.

13. The method according to claim 12, wherein steps a) through d) are repeated in a cyclic fashion and the second evasive trajectory obtained in a first iteration of the method is used as first evasive trajectory in a second iteration when the vehicle is still positioned on the predicted trajectory at the future point in time.

14. A driver assistance system for collision avoidance comprising:
   a proximity sensor configured to detect an obstacle on a predicted trajectory of a vehicle;
   a computer unit configured to search for a first evasive trajectory, on which the vehicle can drive around the obstacle without colliding, and to search for a second evasive trajectory on which the vehicle can drive around the obstacle without colliding, the second evasive trajectory branching off the predicted trajectory at a future point in time relative to the first evasive trajectory;
   a steering system activated by the computer unit in order to steer the vehicle along at least one of the first or second evasive trajectories;
   wherein the computer unit is configured to extrapolate the predicted trajectory from an already driven trajectory and to only activate the steering system and steer the vehicle along the first evasive trajectory if the search for the second evasive trajectory is unsuccessful.

* * * * *